(12) United States Patent
Janally et al.

(10) Patent No.: US 9,744,886 B2
(45) Date of Patent: Aug. 29, 2017

(54) SEAT STRUCTURE

(71) Applicant: Bentley Motors Limited, Crewe Cheshire (GB)

(72) Inventors: Shajahan Janally, Crewe Cheshire (GB); Stuart Russell, Whitchurch Shropshire (GB)

(73) Assignee: Bentley Motors Limited, Crew Cheshire (GB)

( * ) Notice: Subject to any disclaimer, the term of this patent is extended or adjusted under 35 U.S.C. 154(b) by 0 days.

(21) Appl. No.: 14/778,464

(22) PCT Filed: Mar. 21, 2014

(86) PCT No.: PCT/GB2014/050892
§ 371 (c)(1),
(2) Date: Sep. 18, 2015

(87) PCT Pub. No.: WO2014/147414
PCT Pub. Date: Sep. 25, 2014

(65) Prior Publication Data
US 2016/0229317 A1    Aug. 11, 2016

(30) Foreign Application Priority Data
Mar. 22, 2013   (GB) .................................. 1305299.8

(51) Int. Cl.
*B60N 2/30* (2006.01)
*B60N 2/36* (2006.01)

(52) U.S. Cl.
CPC ......... *B60N 2/3095* (2013.01); *B60N 2/3004* (2013.01); *B60N 2/3068* (2013.01); *B60N 2/36* (2013.01)

(58) Field of Classification Search
CPC ... B60N 2/02; B60N 2/04; B60N 2/06; B60N 2/065; B60N 2/08; B60N 2/0818;
(Continued)

(56) References Cited

U.S. PATENT DOCUMENTS 5,120,103 A * 6/1992 Kave .................... B60N 2/0715
248/429
6,250,702 B1   6/2001 Eipper
(Continued)

FOREIGN PATENT DOCUMENTS

DE   10239199        3/2004
DE   10239199 A1 *  3/2004   ............. B60N 2/305
(Continued)

OTHER PUBLICATIONS

International Search Report dated Jun. 18, 2014 for PCT/GB2014/050892, International Filing Date Mar. 21, 2014, 3 pages.

*Primary Examiner* — Jason S Daniels
(74) *Attorney, Agent, or Firm* — Tarolli, Sundheim, Covell & Tummino LLP; John A. Yirga, Esq.

(57) ABSTRACT

A seat structure 6 for mounting to the load space 3 of an automobile 1 includes a seat cushion 9 which, in use, may be positioned to extend out an opening to the load space to provide a seat for a person outside the automobile. The structure is particularly intended to provide a seat to the rear of an estate car, SUV or other automobile fitted with tailgate 4. The seat structure may be removably mountable to the load space of an automobile. The seat structure may comprise mounting assemblies 8 arranged to mount the structure to points at opposite sides of the load space of an automobile. A divider assembly 7 may be pivotally mounted to the mounting assemblies 8 for movement between upright and flat positions. The seat cushion 9 may be movably mounted to the divider assembly for movement between storage and deployed positions.

17 Claims, 8 Drawing Sheets

(58) Field of Classification Search
CPC ...... B60N 2/30; B60N 2/3002; B60N 2/3004; B60N 2/3095
USPC ........ 296/64, 65.01, 65.03, 65.13, 65.16, 68
See application file for complete search history.

(56) References Cited

U.S. PATENT DOCUMENTS

| | | | |
|---|---|---|---|
| 6,364,391 B1 | 4/2002 | Everett | |
| 2012/0104786 A1 | 5/2012 | Wimberley | |
| 2012/0256444 A1* | 10/2012 | Thurmon | ................. B60N 2/24 296/182.1 |
| 2015/0175033 A1* | 6/2015 | Mason | ...................... B60R 5/04 296/65.03 |

FOREIGN PATENT DOCUMENTS

| | | | | |
|---|---|---|---|---|
| DE | 102006058475 | | 7/2008 | |
| EP | 2033839 | | 3/2009 | |
| FR | 2967103 A1 | * | 5/2012 | ............. B60N 2/305 |
| GB | 2523824 A | * | 9/2015 | ........... B60N 2/3065 |
| JP | S6319449 | | 2/1988 | |
| JP | H08324455 | | 12/1996 | |
| JP | H09164885 | | 6/1997 | |
| JP | 2006219017 | | 8/2006 | |
| JP | 4692963 B2 | * | 6/2011 | ................ B60R 5/04 |
| SE | EP 2957457 A1 | * | 12/2015 | ........... B60N 2/3095 |

\* cited by examiner

SEAT STRUCTURE

CROSS REFERENCES TO RELATED APPLICATIONS

The present application is a 35 U.S.C. §371 National Stage Patent Application of International PCT Application Serial No. PCT/GB2014/050892 having an International filing date of Mar. 21, 2014 and that was published on Sep. 25, 2014 under international publication number WO 2014/147414 A1, which claims priority to Great Britain Patent Application Serial No. 1305299.8 that was filed on Mar. 22, 2013. This Application claims priority to and incorporated by reference the above applications in their entireties for all purposes.

TECHNICAL FIELD OF THE INVENTION

The present invention relates to a seat structure for use in an automobile, and to an automobile comprising such a seat structure.

BACKGROUND TO THE INVENTION

The edge of the load space, or opening into the load space, of an automobile fitted with a tailgate can provide a useful seat for persons outside the vehicle when the tailgate is open. The open tailgate may actually provide some shelter for someone sitting on the edge of the automobile in this way.

However, the edge of an automobile load space does not provide a comfortable seat as it is not really intended for this purpose. Provision of a more comfortable seat would likely compromise the load carrying ability of the vehicle.

Embodiments of the present invention have been made in consideration of these problems.

SUMMARY OF THE INVENTION

According to a first aspect of the present invention there is provided a seat structure for mounting to the load space of an automobile, the structure comprising a divider assembly, a lock and a seat cushion, wherein the divider assembly is slidably mountable to one or more tracks in the load space of the automobile for movement along the tracks, the lock may be engaged to lock the divider assembly in one or more selected positions between opposite ends of the or each track and the cushion is moveably mounted to the divider assembly for movement between storage and deployed positions, wherein, when in use and mounted in the load space of an automobile, the divider assembly is operable between an upright configuration in which it may be used to divide the load space and a flat configuration in which the seat cushion may be moved to the deployed position to extend out of an opening to the load space to provide a seat for a person outside the automobile.

Thus, the structure can usefully perform two functions, to help contain or restrain cargo in the load space and, when required, to provide a comfortable, temporary seat to the outside of the vehicle.

The structure may find use with vehicles other than automobiles.

The structure may be removably mountable to the load space of an automobile. In particular, it may be removably mountable to one or more tracks in the load space of the automobile. This allows the seat structure to be deployed only when required, so as not to compromise the load carrying ability of the vehicle.

The lock may be arranged to lock the divider assembly in two, three or more selected positions between opposite ends of the or each track. The lock may be engaged to lock the divider at a plurality of positions, or at any position, along the or each track. In this case the lock may be a friction lock and could comprise a member arranged to grip the track or some other part of the vehicle thereby to lock the divider assembly relative to the automobile. The lock may be arranged to lock the divider at one of a plurality of discrete positions along the track and could be arranged to engage with one or more formations, such as teeth, disposed along the track or otherwise on the automobile.

The seat cushion may be at least partially received into the divider assembly when in the storage position. The seat cushion may be pivotally mounted to the divider assembly for movement between the storage and deployed positions. Stops may be provided to limit pivotal movement of the seat cushion relative to the divider assembly, so that load placed on the cushion is transmitted to the divider assembly. This may enable the seat cushion to be supported in a cantilever fashion and thus to overhang, or partially overhang, the automobile. The seat cushion may comprise a frame which is pivotally connected to the divider assembly, and may be pivotally connected to arms provided in the divider assembly.

The seat structure may comprise one or more mounting assemblies arranged to mount, including slidably mount, the structure to the or each track in the load space. A respective mounting assembly may he mounted at each opposite end of the divider assembly. Each mounting assembly may be intended to slidably mount to a respective track. Two tracks may he located at opposite sides respectively of the load space.

The divider assembly may be pivotally mounted to the or each mounting assembly for movement between the upright and flat configurations Arms comprised in the divider assembly (to which a seat frame may be connected) may be pivotally connected to the mounting assemblies.

A releasable latch may be provided to selectively lock the divider assembly relative to the or each mounting assembly. The releasable latch may be arranged to selectively lock the divider assembly in one or more positions relative to the or each mounting assembly, such as the upright position.

According to another aspect of the invention there is provided an automobile comprising a seat structure according to the first aspect of the invention mounted to one or more tracks in a load space of the automobile. The automobile may he an estate car, wagon or SUV. The seat structure may be fitted to a load space at the rear of the vehicle provided with a tailgate. It may provide a seat to the rear of the vehicle when the tailgate is open.

The or each track may extend fore and aft within the load space of the automobile.

The seat cushion may, in use, in its deployed position, overhang the rear of the automobile.

The seat cushion may, in use, overlie a rear bumper moulding of the automobile.

DETAILED DESCRIPTION OF THE INVENTION

In order that the invention may be more clearly understood an embodiment thereof will now be described, by way of example only, with reference to the accompanying drawings, of which:

Figure 1:
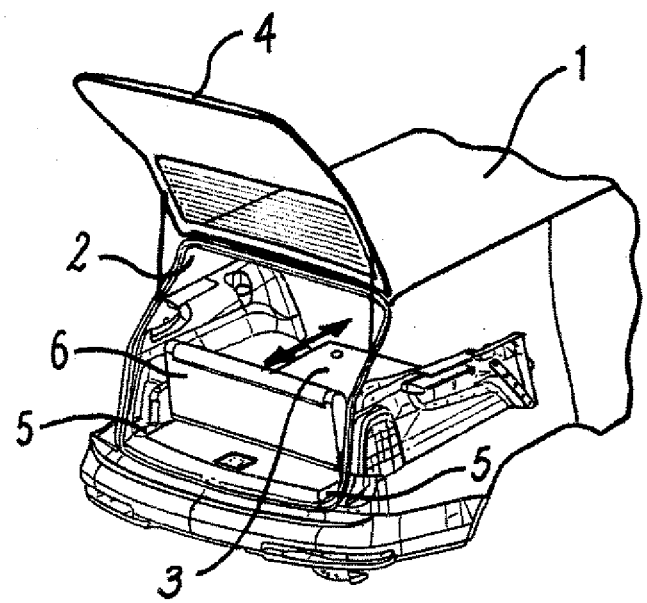
FIG. 1 is a part rear perspective view of an automobile with an open tailgate, with a seat structure mounted in a load area and disposed in a first configuration.
Figure 2:
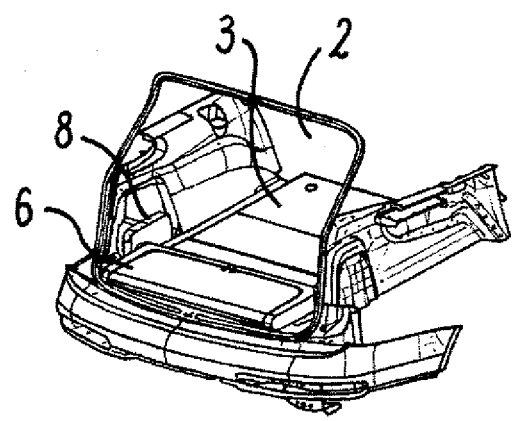
FIG. 2 is a part perspective view of the automobile of FIG. 1 with the seat structure in a second configuration.
Figure 3:
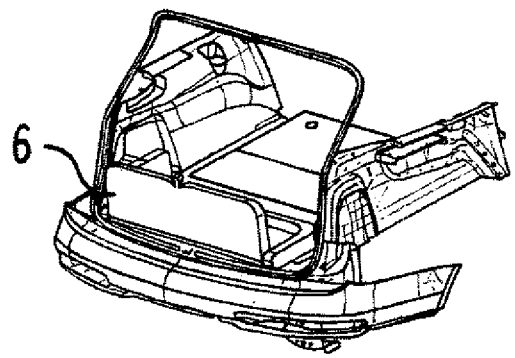
Figure 4:
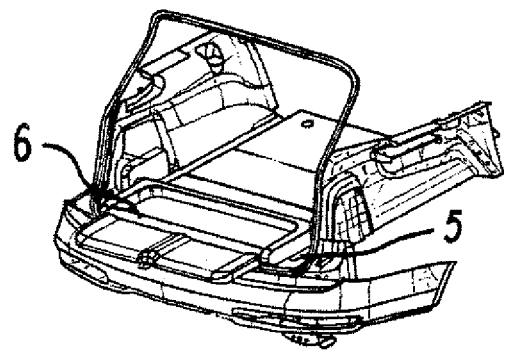
Figure 5:
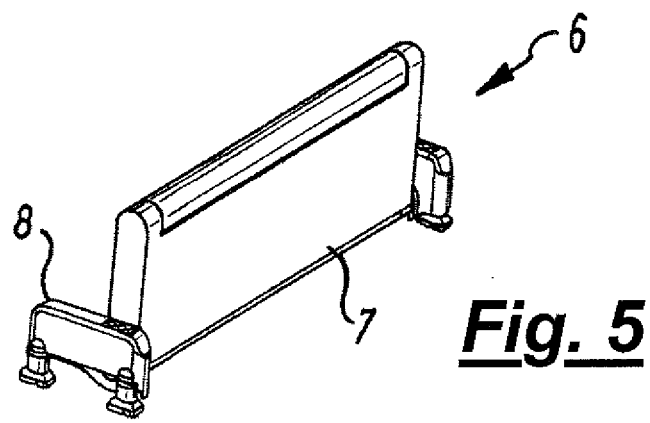
Figure 6:
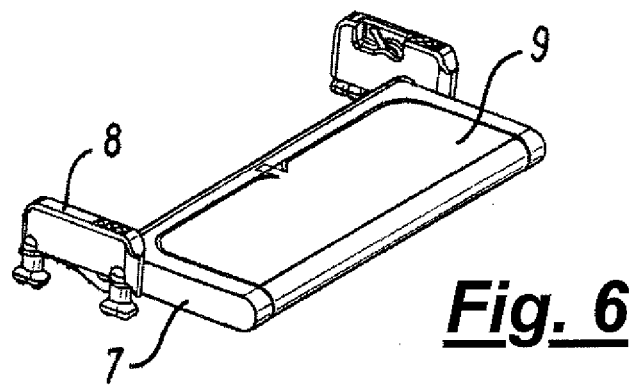
Figure 7:
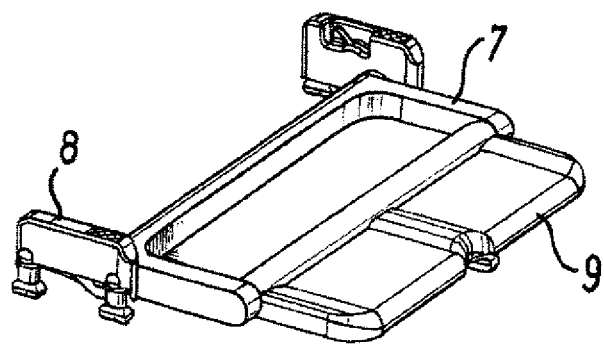
Figure 8:
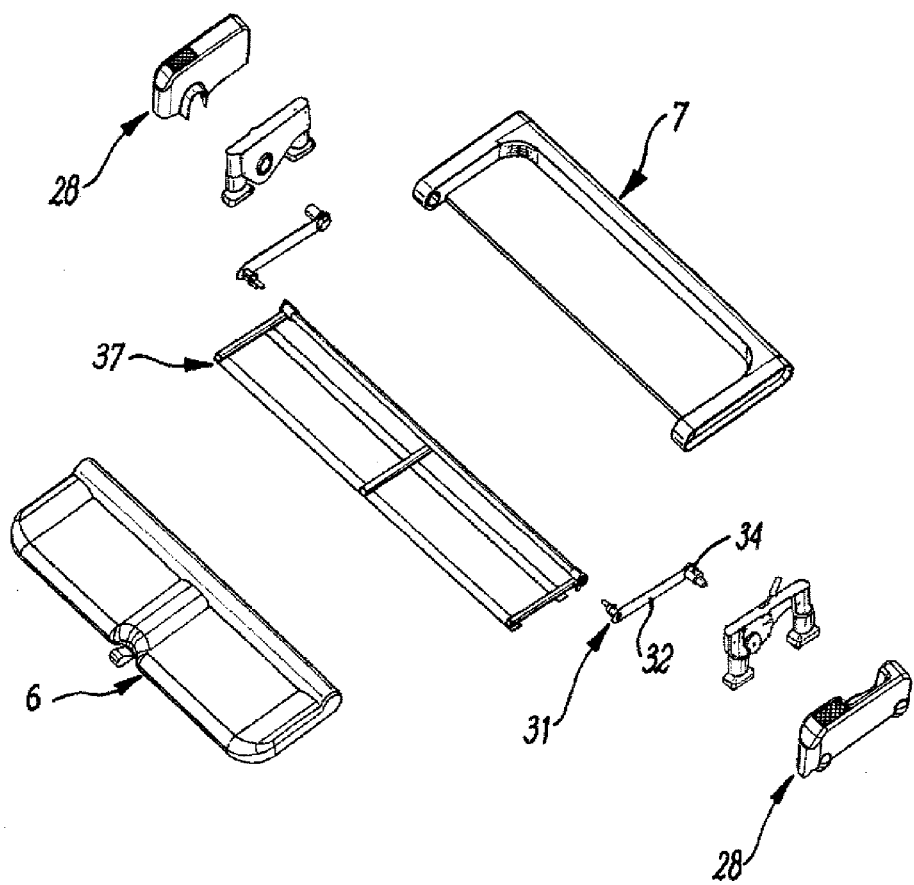
Figure 9:
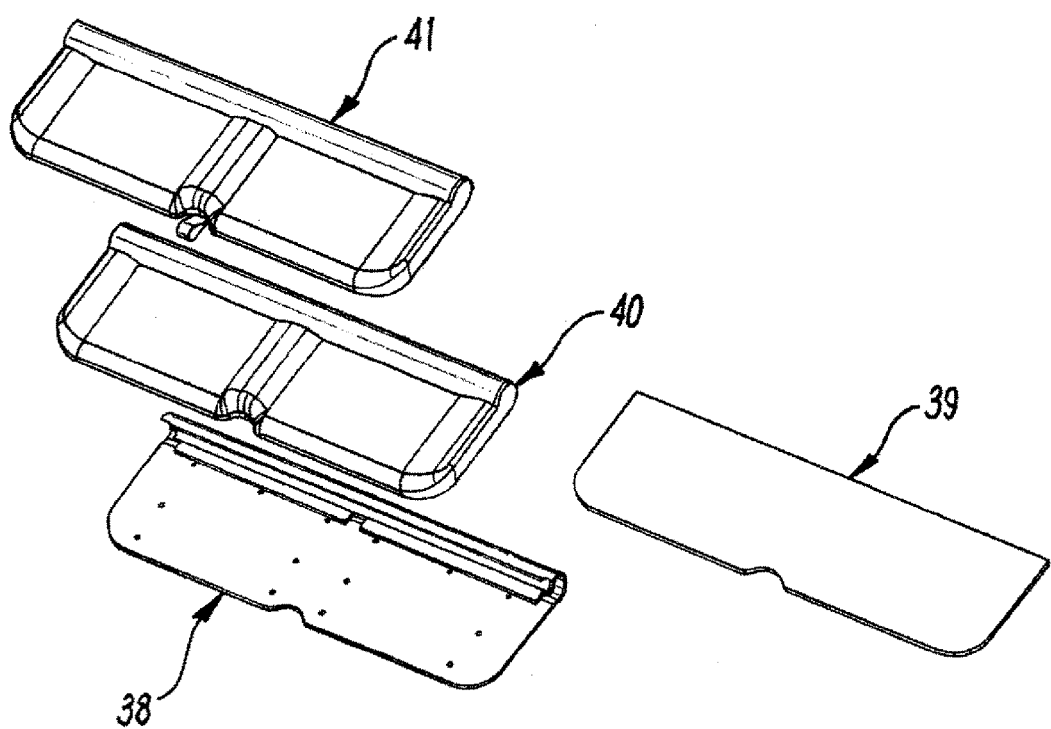
Figure 10:
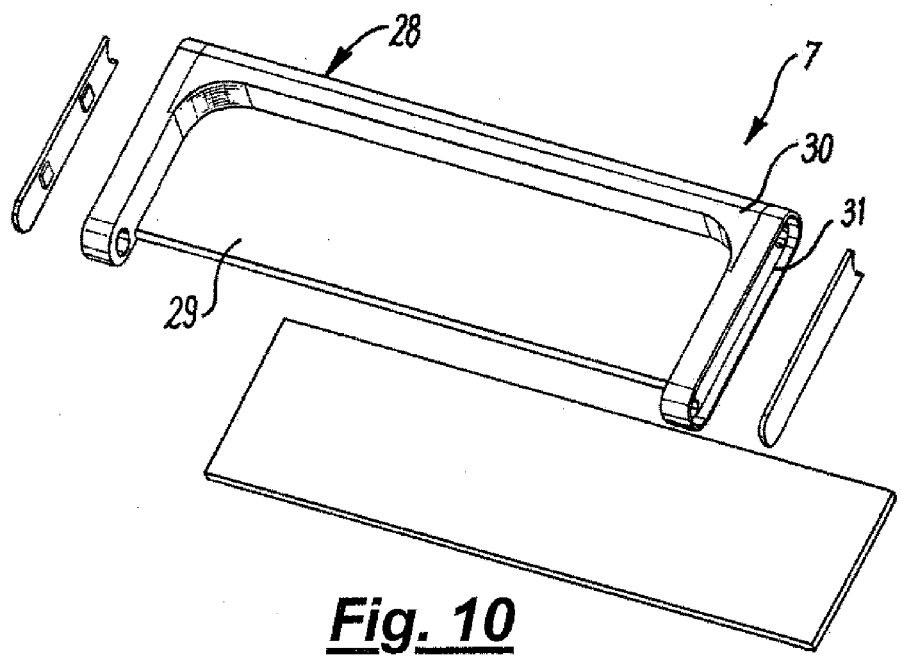
Figure 11:
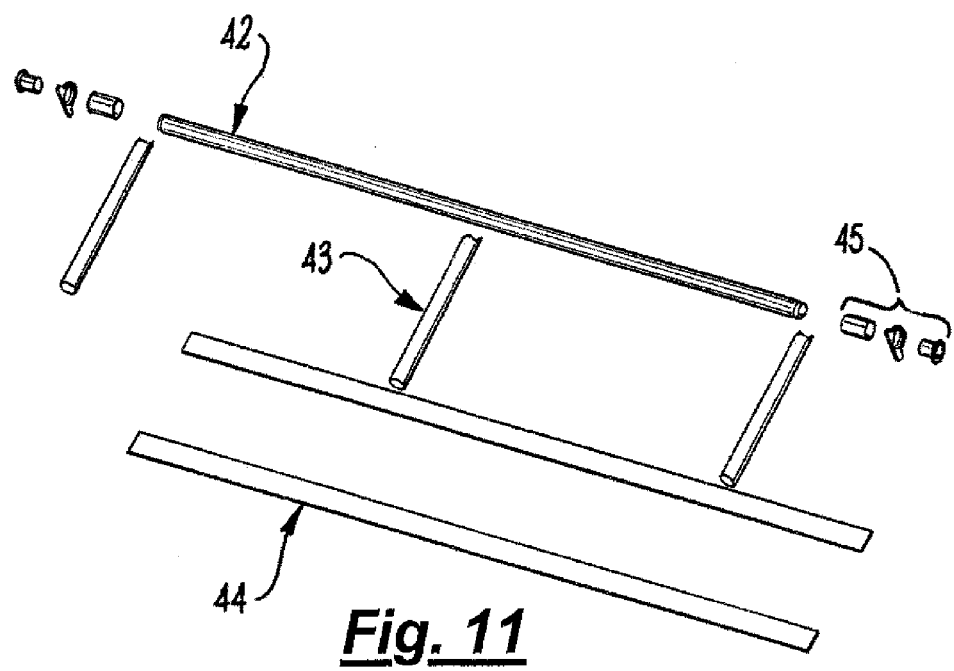
Figure 12:
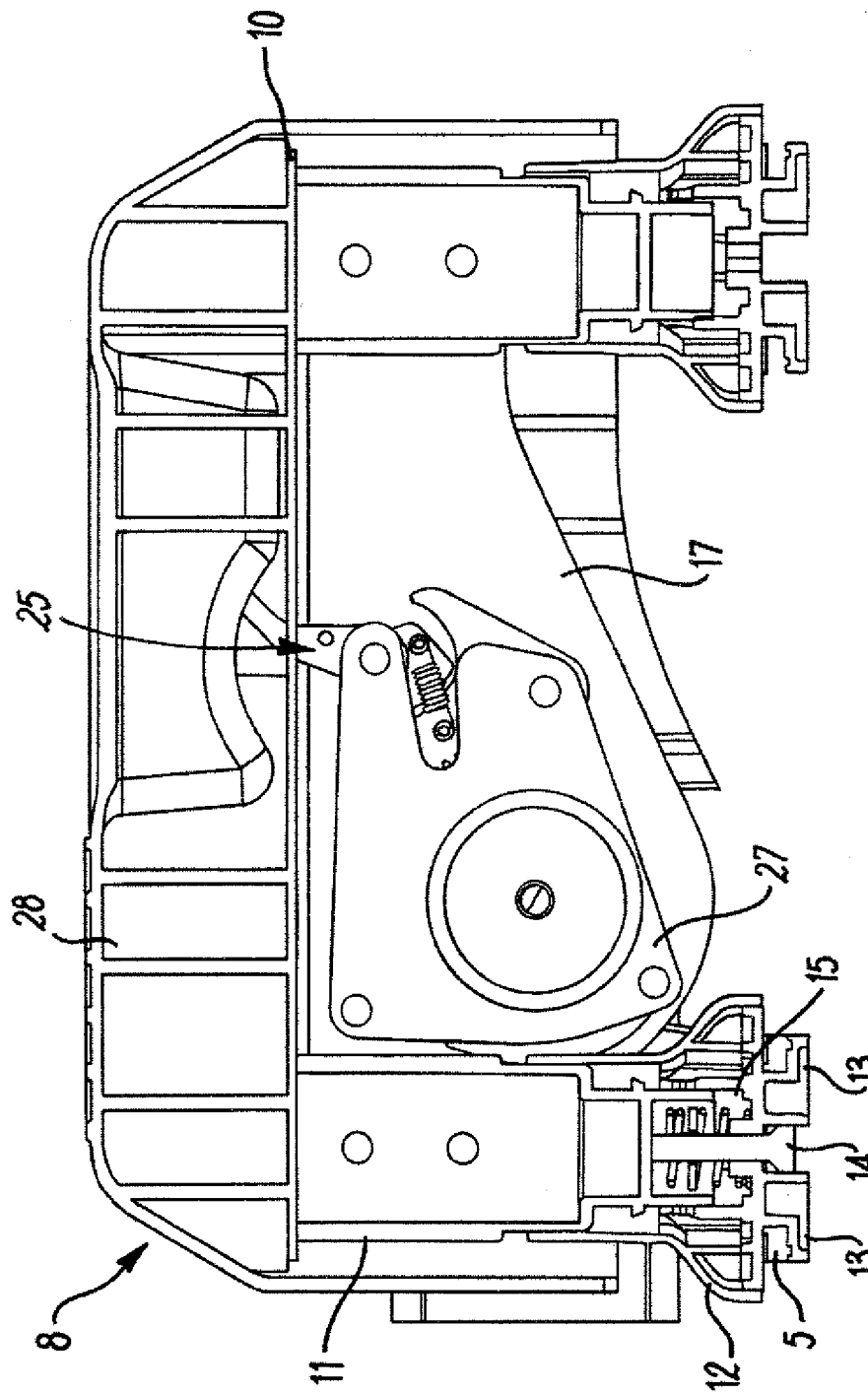
Figure 13:
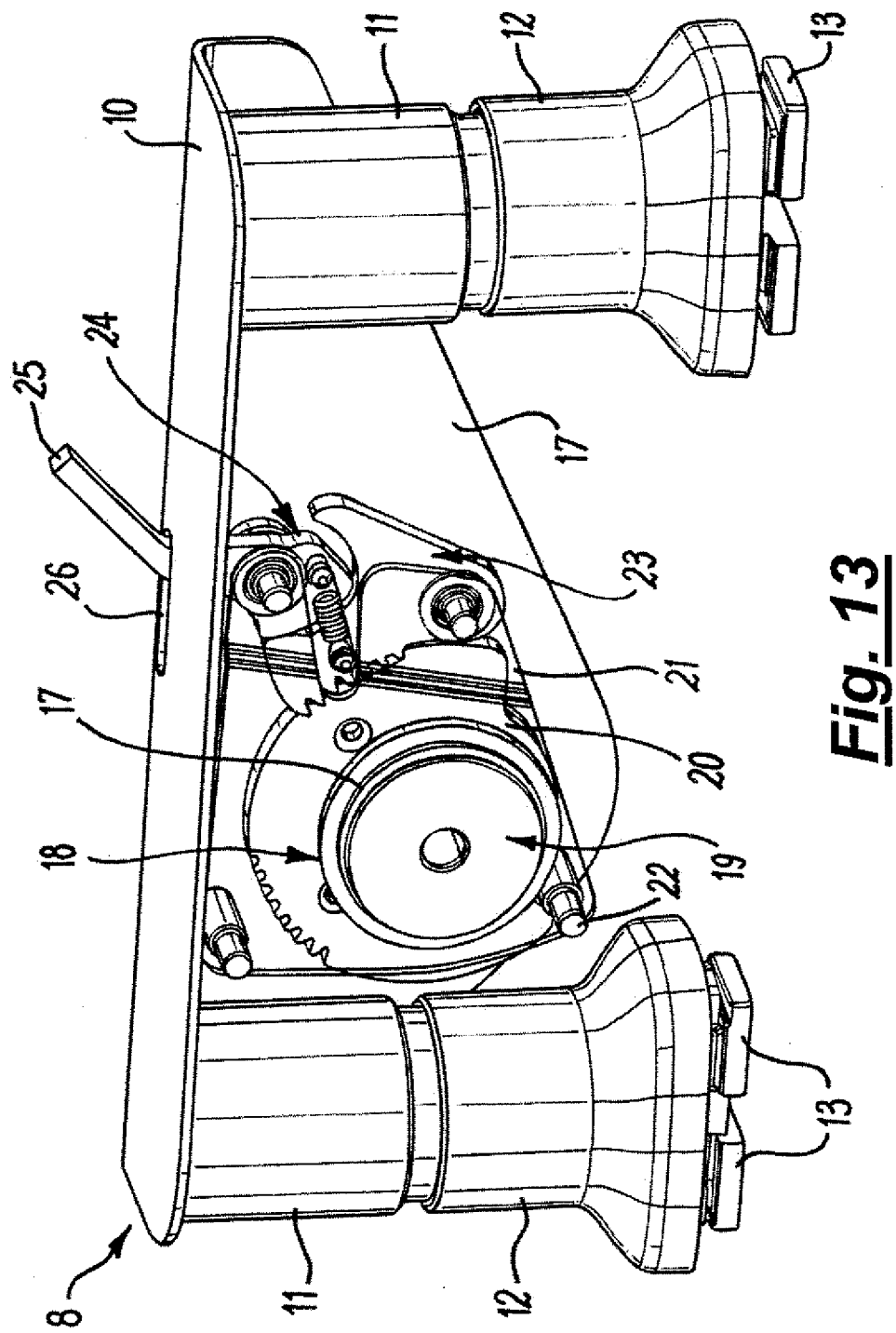

FIG. 3 corresponds to FIG. 2 but with the seat structure between a second and third configuration;

FIG. 4 corresponds to FIG. 2 but with the seat structure in a third configuration;

FIG. 5 is a perspective view of the seat structure of FIGS. 1 to 4 disposed in the first configuration;

FIG. 6 is a perspective view of the seat structure of FIG. 5 in the second configuration;

FIG. 7 is a perspective view of the seat structure of FIG. 5 in the third configuration;

FIG. 8 is an exploded view of the seat structure of FIG. 5;

FIG. 9 is an exploded view of a seat cushion assembly of the seat structure of FIG. 5;

FIG. 10 is an exploded view of a divider assembly of the seat structure of FIG. 5;

FIG. 11 is a part cut-away perspective view of a mounting assembly of the seat structure of FIG. 5; and FIG. 12 is an alternate part cut-away perspective view of a mounting assembly of the seat structure of FIG. 5; and FIG. 13 is a perspective view of mounting assembly.

Referring to the drawings, an automobile 1 such as an estate car, wagon or sport utility vehicle (SUV), has a rear opening 2 leading to an enclosed load area 3 with a generally flat floor. A tailgate 4 is pivotally connected to an upper edge of the opening 2, to pivot about a generally horizontal axis, and is operable to close the opening.

Towards opposite lateral sides of the floor of the load area 3 are provided respective, substantially parallel tracks 5 which extend substantially parallel to a main axis of the automobile 1, i.e. its intended straight line direction of travel. The tracks are formed by elongate slots in the floor of the load area, leading to a wider space under the slots.

A seat structure 6 is mounted to the tracks 5, for movement fore and aft (in the directions shown by the arrow in FIG. 1) along the tracks, and thus relative to the vehicle.

The seat structure 6 comprises a divider assembly 7, which is pivotally mounted at its opposite ends to respective mounting assemblies 8 which each slidably mount to a respective track 5 in the floor of the load area 3. A seat cushion assembly 9 is, in turn, pivotally mounted to the divider assembly 7.

Referring to FIGS. 12 and 13 in particular, the mounting assemblies 8 comprise two legs mounted to the underside of an elongate top plate 10 at opposite respective ends of the plate. Each leg is formed from an upper component 11, the top of which is connected to the underside of the top plate 10 and the bottom of which is slidably and rotatably received into the top of the lower component 12. Both components 11, 12 have a substantially circular cross-section. The lower component 12 defines a generally flat base from which depend two opposed L-shaped feet 13. The feet are connected to as rod 14 connected to the upper component 11 enabling the feet to move, together with upper component 11, relative to the lower component 12. A resilient member, such as a helical compression spring 15, is disposed between the upper and lower leg components, urging them apart and thereby urging the L-shaped feet 13 into contact with the underside of the lower leg component 12.

In use the upper leg component 11 is urged into the lower leg component 12, compressing the spring 14, to move the L-shaped feet 13 away from the underside of the lower leg component 12. The feet 13 can then be inserted into the slot of a track 5 in the load space floor and the lower leg component 12 rotated so that the feet extend under the floor either side of the slot. The upper leg component 11 can then be released relative to the lower leg component 12, allowing the spring 14 to urge the feet 13 towards the base of the lower leg 12 component, thereby gripping the edges of the slot forming the track 5 between the feet 13 and the underside of the lower leg component 12. This restricts sliding of the leg relative to the slot unless the upper 11 and lower 12 leg components are urged together. This enables the legs, and thus the mounting assembly 8, to be locked at any desired position along the track 5.

Each leg of each assembly may comprise resiliently biased upper and lower components operative to lock the leg relative to the track 5. Alternatively, only one leg of each assembly may be provided with a locking arrangement. In a further alternative one assembly is provided with one or two locking legs and the other assembly does not include any locking arrangement.

A side plate 17 extends between the two legs, connected to and extending substantially at right angles to the top plate 10. The side plate 17 on each mounting assembly supports as hearing 17 disposed in a bearing ring 18 and provided with a washer 19, to which the divider assembly 7 is mounted to enable it to pivot relative to the mounting assembly 8. One of the mounting assemblies 8 additionally comprises a latch which is operative to lock the divider assembly 7 relative to the mounting assembly in desired relative positions. The latch assembly comprises a recline plate 10 mounted for rotation with the divider assembly and a fixed plate 21, fixed relative to the side plate 17. A stop 22, in the form of a projecting pin, is mounted to the fixed plate 21. The recline plate 20 is shaped and positioned relative to the stop 22 so that the stop limits rotation of the recline plate relative to the fixed plate between two limits. The fixed plate also supports a toothed locking pawl 22. The pawl 22 is pivotally mounted to the fixed plate 21 and can move between a locking position where teeth on the pawl can engage with teeth on the periphery of the recline plate 20, to prevent movement of the recline plate 20 relative to the fixed plate 21 and a release position where there is clearance between the pawl 23 and the recline plate 20, allowing movement of the recline plate 20 relative to the fixed plate 21.

A locking cam 24 is also pivotally mounted to the fixed plate 21. The cam comprises a user operable lever 25 which protrudes through an elongate slot 26 in the top plate 10. The cam 24 is operable between a locking position in which it urges the pawl 23 into its locking position and retains it in that position, and a release position in which it urges the pawl 23 into, and retains it in, its release position.

The latch assembly is similar to latch assemblies employed in seat back dump mechanisms. It is covered by a corer plate 27.

The mounting assembly is covered by a plastics material moulding 28, which also defines a slot through which the lever 25 protrudes.

With particular reference to FIGS. 8 and 10, the divider assembly 7 comprises a plastics material moulding 28. The moulding 28 has a generally elongate rectangular shape and takes the form of a generally flat plate 29 with a raised wall 30 around three sides, there being no wall along one of its longer sides. The inner face of the wall 30 has curved corners. The outer face of the wall along the long side of the moulding is convex, with the axis of curvature substantially parallel to the edge of the wall. The outer faces of each of the walls along the two shorter sides define elongate recesses 31. These walls extend just beyond the plate 29 and a substantially circular aperture extends through each wall, in the recess, in the part of the wall that extends beyond the plate 29. These two apertures are aligned with each other. A metal support arm 32, formed from an elongate metal plate is disposed in each recess 31. Cushion frame pivot pins, including stops, 33 are mounted to the arm 32 and extend through the apertures in the walls 30, the pins 33 on opposite sides of the divider assembly 7 facing each other. A divider assembly support pin 34 is mounted to the opposite end and opposite side of each support arm 32 to the cushion frame pivot pins 33. The divider assembly support pins 34 thus face outwardly from the divider assembly 7. A cover plate 35 is mounted over each recess 31 to conceal the support arm. The cover plate 35 has a concave end which extends around the divider support pin 34, allowing the pin 34 to protrude beyond the cover plate 35.

A layer of carpet 36 is bonded to the plate 29 of the divider assembly 7, in the region bounded by the wall 30.

The seat cushion assembly 9 is pivotally mounted to the divider assembly by way of the cushion frame pivot pins 33. With particular reference to FIGS. 8, 9 and 11 the seat cushion assembly 9 comprises a metal cushion frame 37. The frame 37 is mounted to a moulded plastics substrate 38 which comprises an elongate, generally rectangular plate with a formation along one of its longer sides arranged to receive part of the cushion frame 37. A carpet 39 is bonded to one side of the substrate 38 and a foam cushion 40 is affixed to the other side of the substrate and covered with upholstery 41.

The cushion frame 37 is formed by a rear, metal tube 42 connected by cross tubes 43 to generally parallel metal strips 44 to form a framework. End fittings 42, including a stop, are fitted to the ends of the rear tube and intended to be received over the cushion pivots 33 of the divider assembly 7 thereby to pivotally mount the cushion assembly 9 to the divider assembly 7. The two assemblies are arranged so that the cushion assembly may pivot through substantially 180 degrees between a storage position, shown in FIGS. 5 and 6, where the cushion assembly is received into the region of the divider assembly bounded by the wall 30 so that the carpet backed part of the cushion assembly lies flush with the top of the wall 30, and a deployed position, shown in FIG. 7, where the cushion assembly 9 lies generally within the same plane as the divider assembly 7. The stops incorporated in the end fittings 45 and the pivot pins 33 interact to prevent the cushion assembly pivoting relative to the divider assembly 7 beyond the deployed position.

The support pins 34 of the divider assembly are received into the bearings of the mounting assemblies 8, with the support pin received into the mounting assembly incorporating the latch being rotatably connected to the recline plate 20 of the latch. The recline plate 20 and stop 22 are arranged to enable the divider assembly 7 to pivot relative to the mounting assemblies 8 between an upright configuration, shown in FIG. 5, and a flat configuration, shown in FIGS. 6 and 7.

In use the seat structure 6 is mounted to the floor of the load area 3 floor of the automobile 1 by engaging the mounting assemblies 8 in the tracks 5 on the floor of the load area. The position of the structure 6 in the load area 3 may be adjusted by sliding the mounting assemblies 8 along the tracks 5. This is achieved by pushing down on the (or each) mounting assembly 8 incorporating a locking means, either directly or by pushing down on the divider assembly 7, to release the locking means, sliding the whole structure to a desired position on the tracks 5 and then releasing pressure on the mounting assemblies 8 to allow the locking means to lock the or each mounting assembly 8 relative to the track in which it is mounted, at any desired position along the length of the track.

The position of the divider assembly may be adjusted between the upright and flat positions by moving the lever 25 to a release position, moving the divider assembly to the desired position and then moving the release lever 25 to the lock position to lock the divider assembly relative to the mounting assembly. When the divider assembly 7 is in the flat position it may, at least partially, be supported on the floor of the load space. The latch may be arranged to lock the divider assembly 7 in positions in between the upright and flat positions.

When the divider assembly 7 is in the upright position it can act as a luggage space divider, useful for dividing the load area 3 of the vehicle 1 to help in containing a load. For example, a load could be confined in a space between the divider assembly 7 and the tailgate, or divider assembly 7 and rear seat of the vehicle.

When the divider assembly 7 is in the flat position, the cushion assembly 9 may be pivoted through 180 degrees to its deployed position in order to form a seat. At least when the mounting assemblies are in their rear-most position the cushion assembly may partially or wholly extend out of the load space 3 of the automobile. In this position some or all of the seat cushion assembly may be supported on part of the automobile, such as on the top of a rear bumper moulding. Or it may wholly or partially overhang the rear of the automobile. In this position the seat assembly provides a useful seat, which may be useful for automobile occupants to use when attending an outdoor event. The seating position may benefit from at least partial shelter from the open tailgate.

When the seat cushion assembly 9 at least partially overhangs the rear of the automobile some or all of a load applied to the assembly may be transmitted to the automobile via the seat cushion frame 37, arms 32 and mounting assemblies 8.

When not required the whole seat structure may be removed from the automobile in order to maximise available load space.

Alternatives are possible. In one arrangement the locking arrangement which locks the mounting assemblies to the tracks may be engaged and released by the action of pivoting the divider assembly relative to the mounting means. The locking means might, for example, be arranged to engage when the divider assembly is in the upright and flat positions and to release when intermediate positions.

The various load hearing components of the structure may be formed from metal, typically steel.

The above embodiment is described by way of example only. Many variations are possible without departing from the scope of the invention as defined in the appended claims.

The invention claimed is:

1. A seat structure for mounting to a load space of an automobile, the structure comprising a divider assembly, a lock and a seat cushion, wherein the divider assembly is slidably mountable to one or more tracks in the load space of the automobile for movement fore and aft within the automobile along one or each of the tracks, the lock may be engaged to lock the divider assembly in one or more selected positions between opposite ends of the one or each of the tracks and the cushion is moveably mounted to the divider assembly for movement between storage and deployed positions, wherein, when in use and mounted in the load space of the automobile, the divider assembly is operable between an upright configuration in which it may be used to divide the load space and a flat configuration, such that when the divider assembly is in the flat configuration it is at least partially supported on a floor of the load space and the seat cushion may be moved to the deployed position to extend out of an opening to the load space to provide a seat for a person outside the automobile.

2. The seat structure as claimed in claim 1 wherein the structure is removably mountable to the load space of the automobile.

3. The seat structure as claimed in claim 1 wherein the lock may be engaged to lock the divider at a plurality of positions between opposite ends of the one or more tracks.

4. The seat structure as claimed in claim 1 wherein the lock may be engaged to lock the divider at any position along a length of the one or each of the tracks.

5. The seat structure as claimed in claim 1 wherein the lock comprises a member arranged to grip a part of the automobile thereby to lock the divider assembly relative to the automobile.

6. The seat structure as claimed in claim 1, wherein the seat cushion is at least partially received into the divider assembly when in the storage position.

7. The seat structure as claimed in claim 1 wherein the seat cushion is pivotally mounted to the divider assembly.

8. The seat structure as claimed in claim 7 wherein stops are provided to limit pivotal movement of the seat cushion relative to the divider assembly, so that load placed on the cushion may be transmitted to the divider assembly.

9. The seat structure as claimed in claim 7 wherein the seat cushion comprises a frame which is pivotally connected to arms comprised in the divider assembly.

10. The seat structure as claimed in claim 1 comprising one or more mounting assemblies arranged to slidably mount the structure to the or each track in the load space.

11. The seat structure as claimed in claim 10 wherein a respective mounting assembly is provided at each opposite end of the divider assembly, each mounting assembly being arranged to slidably mount to a respective track, each track being located at an opposite side respectively of the load space.

12. The seat structure as claimed in claim 10 wherein the divider assembly is pivotally mounted to the one or more mounting assemblies for movement between the upright and flat configurations.

13. The seat structure as claimed in claim 12 wherein a releasable latch is provided to selectively lock the divider assembly in one or more positions relative to the or each mounting assembly.

14. The automobile as claimed in claim 1 wherein the seat cushion may, in use, overhang the rear of the automobile or overlie a rear bumper moulding of the automobile.

15. The seat structure as claimed in claim 1 wherein, in use, when the seat cushion is in the flat configuration it is at least partially supported on the floor of the load space.

16. A seat structure for mounting to a load space of an automobile, the structure comprising:
 a divider assembly, a lock, and a seat cushion, wherein the divider assembly is slidably mountable to one or more tracks on a floor of the load space of the automobile for movement fore and aft within the automobile along the one or more tracks;
 the lock may be engaged to lock the divider assembly in one or more selected positions between opposite ends of the one or each of the tracks and the cushion is moveably mounted to the divider assembly for movement between storage and deployed positions;
 wherein, when in use and mounted in the load space of the automobile, the divider assembly is operable between an upright configuration in which it divides the load space and a flat configuration;
 further wherein the divider assembly is pivotally mounted to the one or more mounting assemblies for movement between the upright and flat configurations such that when the divider assembly is in the flat configuration the divider assembly is at least partially supported on the floor of the load space and wherein the seat cushion is movable to the deployed position to extend out of an opening to the load space to provide a seat for a person outside the automobile, further wherein the lock is engageable to lock the divider at a plurality of positions between opposite ends of the one or more tracks.

17. The seat structure as claimed in claim 16 wherein the lock is engageble to lock the divider at any position along a length of the one or each of the tracks.

* * * * *